United States Patent [19]

Usui et al.

[11] Patent Number: 5,072,789
[45] Date of Patent: Dec. 17, 1991

[54] HEAT EXCHANGER MADE OF ALUMINUM

[75] Inventors: Tadashi Usui; Shinji Kagoshige, both of Tochigi, Japan

[73] Assignee: Showa Aluminum Corporation, Sakai, Japan

[21] Appl. No.: 623,625

[22] Filed: Dec. 6, 1990

[30] Foreign Application Priority Data

Dec. 8, 1989 [JP] Japan .................. 1-319123

[51] Int. Cl.⁵ ............................................. F28F 19/00
[52] U.S. Cl. .................................. 165/134.1; 228/183
[58] Field of Search ............................ 165/133, 134.1; 228/183, 198; 204/147, 196

[56] References Cited

U.S. PATENT DOCUMENTS

| | | | |
|---|---|---|---|
| 4,510,030 | 4/1985 | Miyashita et al. | 204/147 |
| 4,732,311 | 3/1988 | Hasegawa et al. | 228/138 |
| 4,831,701 | 5/1989 | Yutaka | 228/183 X |
| 4,842,185 | 6/1989 | Kudo et al. | 228/183 |

FOREIGN PATENT DOCUMENTS

| | | | |
|---|---|---|---|
| 60-21176 | 2/1985 | Japan | 228/183 |
| 61-186164 | 8/1986 | Japan | 228/183 |
| 61-259871 | 11/1986 | Japan | 228/183 |
| 62-97767 | 5/1987 | Japan | 228/183 |
| 62-156071 | 7/1987 | Japan | 228/183 |

*Primary Examiner*—Allen J. Flanigan
*Attorney, Agent, or Firm*—Armstrong, Nikaido, Marmelstein, Kubovcik & Murray

[57] ABSTRACT

A heat exchanger made of aluminum includes a tube and a fin joined thereto by a fillet which is made primarily of zinc. The tube and the fin are each prepared from a material made of aluminum and nobler than the fillet by at least 0.325 V in terms of potential. The use of the material for forming the tube and the fin prevents cracks from developing in the vicinity of the interface between the fillet and the tube or the fin.

9 Claims, 1 Drawing Sheet

HEAT EXCHANGER MADE OF ALUMINUM

BACKGROUND OF THE INVENTION

The present invention relates to heat exchangers made of aluminum, for example, for use as condensers, evaporators, radiators or the like.

The term "made of aluminum" as used herein and in the appended claims includes "made of an aluminum alloy."

For example, condensers for use in motor vehicle air conditioners are known which comprise a zigzag flat tube made of aluminum, corrugated fins made of aluminum and arranged between and joined to the adjacent straight tubular portions of the tube, and a joint member made of aluminum and joined to each end of the tube.

The tube used for the condenser is one which is made of JIS (Japanese Industrial Standard) A1100 which is easily extrudable, and the corrugated fins are usually those made of JIS A1N30 which can readily be shaped. The condenser is fabricated, for example, by assembling the tube, corrugated fins and joint members; applying to the assembly a joining slurry consisting essentially of zinc chloride serving as a Lewis acid and a solvent acting thereon as a Lewis base; and thereafter, heating the assembly. The corrugated fins are joined to the tube by a fillet which is substantially composed of zinc produced by heating the joining slurry.

However, with the conventional condenser which is fabricated by joining the components together, the tube has a pitting potential of $-0.725$ V, and the corrugated fins have a pitting potential of $-0.746$ V, while the fillet has a pitting potential of $-1.05$ V. Since the potential difference between the fillet and the corrugated fins is not sufficiently great, the condenser experiences a problem when used for a prolonged period of time in corrosive environments having a high temperature or high humidity or involving salt damage in spite of being free of service problems under ordinary conditions. As shown in FIG. 3, cracks 5 develop in the vicinity of the interface between the fillet 4 and the tube 1, as well as between the fillet 4 and the corrugated fin 2; thereby permitting separation of the corrugated fin 2 and resulting in a lower heat exchange efficiency. The reason why such cracks develop is presumably for the following reasons, although this has yet to be fully clarified. Since the potential difference between the fillet 4 and the tube 1 or the fin 2 is not very great, little or no current flows therebetween, and the metal on the fillet side dissolves in the form of cations, especially in the vicinity of the interface between the fillet 4 and the tube 1 or the fin 2; thereby causing corrosion to the boundary portions to produce cracks 5 early.

SUMMARY OF THE INVENTION

The main object of the present invention is to provide a heat exchanger made of aluminum and free of the above described problems.

The present invention provides a heat exchanger made of aluminum and includes a tube and fins joined thereto by a fillet substantially composed of zinc, each of the tube and the fins being made of a material nobler than the fillet by at least 0.325 V in terms of potential.

With the heat exchanger of aluminum embodying the present invention, the tube and the fin are each made of a material nobler than the fillet by at least 0.325 V in terms of potential. This prevents cracks from developing in the vicinity of the interfaces between the tube and the fillet and between the fin and the fillet. The reason therefore is presumably as follows although this has yet to be fully clarified. When a local cell is formed by the deposition of water on the joint between tube and the fillet, as well as between the fin and the fillet, a current satisfactorily follows between the fillet and the tube or the fin thereby, preventing the metal on the fillet side from dissolving in the form of cations in the vicinity of the joint interface between the fillet and the tube or the fin to preclude corrosion in the vicinity of the interface. Although the fillet becomes gradually corroded in this case, the corrosion is surface corrosion. Accordingly since current smoothly flows between the fillet and the tube or the fin, cracks will not occur in the vicinity of the interface between the fillet and the tube or the fin, and the fin is less likely to separate off.

The present invention will be described below in greater detail with reference to FIGS. 1 and 2 of the accompanying drawings.

DESCRIPTION OF THE PREFERRED EMBODIMENTS

Figure 1:
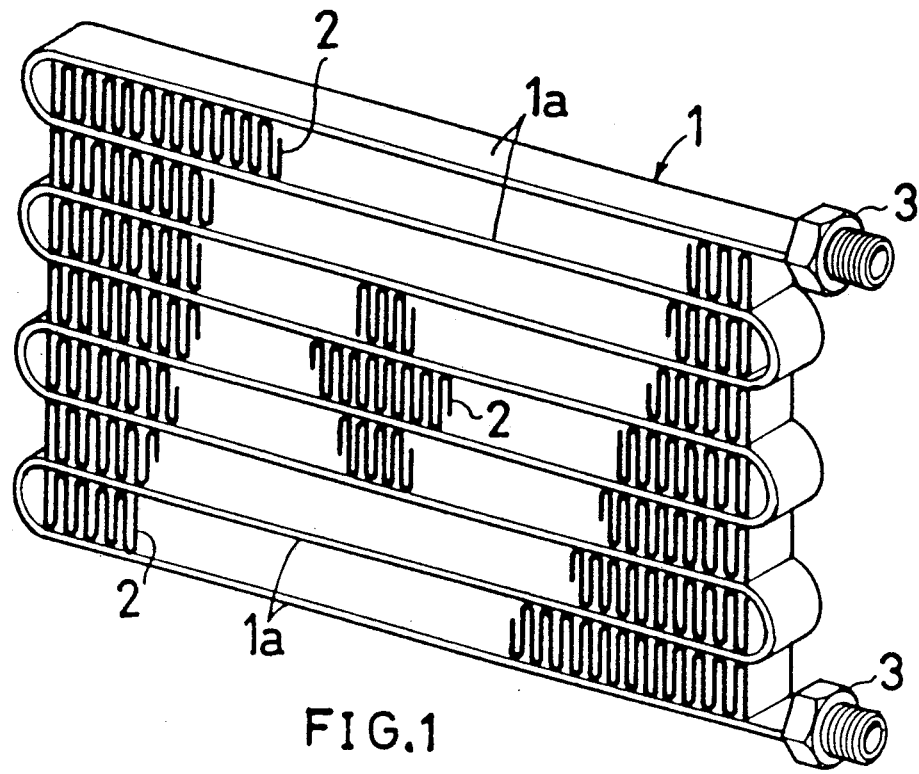
FIG. 1 is a perspective view showing a heat exchanger made of aluminum and is useful as a condenser for motor vehicle air conditioners.
Figure 2:
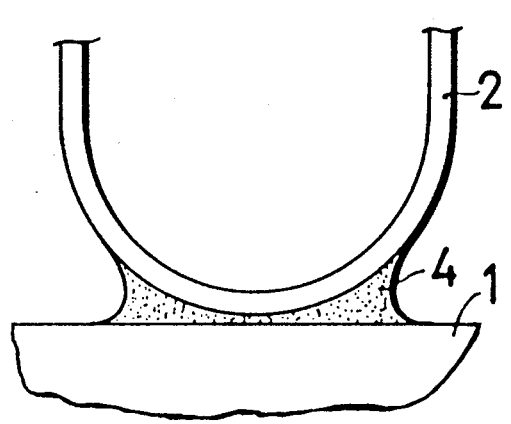
FIG. 2 is an enlarged fragmentary side elevation of FIG. 1.
Figure 3:
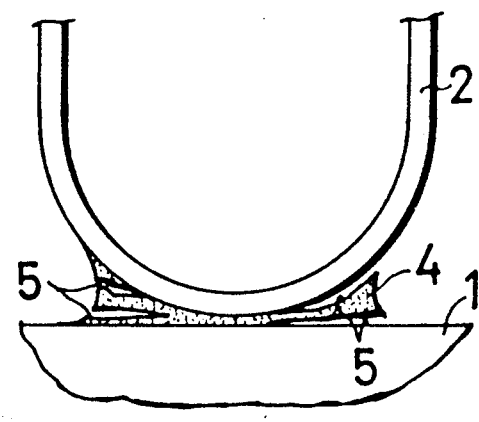
FIG. 3 is a view corresponding to FIG. 2 and shows a conventional heat exchanger made of aluminum for use as a condenser for motor vehicle air conditioners.

FIG. 1 shows a heat exchanger made of aluminum and is useful as a condenser for motor vehicle air conditioners. The heat exchanger comprises a zigzag flat tube 1 made of aluminum, corrugated fins 2 made of aluminum and arranged between and joined to the adjacent straight tubular portions 1a of the tube 1, and a joint member 3 made of aluminum and joined to each end of the tube 1. Each corrugated fin 2 is joined to the tube 1 by fillets 4 which are substantially composed of zinc.

The tube 1 and the fin 2 are each made of a material nobler than the fillet 4 by at least 0.325 V in terms of potential. An example of a useful material which is nobler than the fillet 4 by at least 0.325 V in terms of potential is an aluminum alloy comprising 0.1 to 1.0 wt. %, preferably 0.2 to 0.5 wt. %, of copper, and the balance being aluminum and inevitable impurities. Also useful is an aluminum alloy comprising 0.1 to 1.0 wt. %, preferably 0.2 to 0.5 wt. %, of copper, 0.1 to 1.0 wt. %, preferably 0.2 to 0.5 wt. %, of manganese, and the balance of aluminum and inevitable impurities. Also useful is an aluminum alloy comprising 0.1 to 1.0 wt. %, preferably 0.2 to 0.5 wt. %, of copper, 0.1 to 1.0 wt. %, preferably 0.2 to 0.5 wt. %, of manganese, at least one of titanium, boron, chromium and zirconium in an amount of 0.01 to 0.1 wt. %, 0.01 to 0.1 wt. %, 0.01 to 0.5 wt. % and 0.01 to 0.5 wt. % respectively, and the balance of aluminum and inevitable impurities. It is especially desirable that the tube 1 and the fin 2 be made of a material nobler than the fillet 4 by at least 0.375 V in terms of potential. Although not limitative, the tube 1 and the fin 2 are preferably made of the same material.

The fin 2 is joined to the tube 1, for example, by applying thereto a joining slurry consisting essentially of zinc chloride serving as a Lewis acid and a solvent acting thereon as a Lewis base, and heating the fin and the tube. This process forms fillets 4 which primarily comprise zinc and by which the fin 2 are joined to the tube 1.

Examples of useful solvents which act on zinc chloride as Lewis bases are acetone or like ketones, alcohols, aldehydes, water, nitriles, esters, lactones, ethers, etc. These solvents are used singly or in admixture. The joining slurry may have incorporated therein a flux; such as, ammonium chloride or like ammonium halide, sodium fluoride, sodium iodide, sodium bromide, acidic sodium fluoride, acidic potassium fluoride, potassium fluoride or lithium fluoride.

Alternatively, the fin 2 is joined to the tube 1 by coating the surface of the tube 1 with zinc by spray coating or dipping to form a zinc coating layer having a thickness of 10 to 100μ while the surface has a high temperature and is active immediately after the tube 1 is extruded, holding the fin 2 to the tube 1 in intimate contact with the zinc coating layer, applying a flux for zinc solder to the assembly, and then heating the assembly for soldering. This method forms fillets 4 from the zinc coating layer. For zinc coating in this method, the tube 1 is dipped immediately after extrusion in a molten zinc bath which is given ultrasonic vibration.

Although the heat exchanger of aluminum described above is used as a condenser for motor vehicle air conditioners, the heat exchanger of the invention is not limited to such use but is also usable as an evaporator, radiator or other device.

EXAMPLE 1

A zigzag flat tube 1 and corrugated fins 2 were prepared from an aluminum alloy comprising 0.5 wt. % of copper, 0.3 wt. % of manganese, and the balance of aluminum and inevitable impurities. The tube 1 and the corrugated fins 2 were then assembled, and the assembly was dipped in a joining slurry composed of 50 wt. % of zinc chloride and 50 wt. % of acetone serving as a solvent. The assembly was subsequently heated to 420° C. with a gas burner and thereafter washed with water to remove the remaining slurry, whereby a heat exchanger was fabricated.

EXAMPLE 2

A zigzag flat tube 1 and corrugated fins 2 were prepared from an aluminum alloy comprising 0.3 wt. % of copper, and the balance of aluminum and inevitable impurities. The same procedure as in EXAMPLE 1 was thereafter repeated to fabricate a heat exchanger.

EXAMPLE 3

A zigzag flat tube 1 and corrugated fins 2 were prepared from an aluminum alloy comprising 0.4 wt. % of copper, 0.4 wt. % of manganese, 0.2 wt. T of titanium, and the balance of aluminum and inevitable impurities. The same procedure as in EXAMPLE 1 was thereafter repeated to fabricate a heat exchanger.

EXAMPLE 4

A zigzag flat tube 1 was prepared from an aluminum alloy comprising 0.5 wt. % of copper, 0.3 wt. % of manganese, and the balance of aluminum and inevitable impurities. Further, corrugated fins 2 were prepared from an aluminum alloy comprising 0.2 wt. % of copper, 0.3 wt. % of manganese, 0.2 wt. % of chromium, and the balance of aluminum and inevitable impurities. With the exception of the above steps, a heat exchanger was fabricated in the same manner as in EXAMPLE 1.

EXAMPLE 5

A zigzag flat tube 1 was extruded from an aluminum alloy comprising 0.5 wt. % of copper, 0.3 wt. % of manganese, and the balance of aluminum and inevitable impurities. A zinc coating layer, 30μ in thickness, was formed over the entire surface of the tube 1 by spray coating with use of a zinc wire while the tube surface had a high temperature and was active immediately after the extrusion. Further, corrugated fins 2 were prepared from the same aluminum alloy as above. A heat exchanger was fabricated by holding the corrugated fins 2 to the tube 1 in intimate contact therewith, applying a soldering flux to the assembly, and thereafter heat the assembly to about 400° C, followed by washing with hot water and drying for removing the flux.

COMPARATIVE EXAMPLE

A heat exchanger was fabricated in the same manner as in EXAMPLE 1 with the exception of the use of corrugated fins 2 made of JIS A1N30 and a zigzag flat tube 1 made of JIS A1100.

EVALUATION TEST

For each of the heat exchangers produced in EXAMPLES 1 to 5 and COMPARATIVE EXAMPLE, the tube 1, the corrugated fin 2, and the fillet 4 between the tube 1 and the fin 2 were checked for obtaining pitting potential in an aqueous solution comprising 2.67 wt. % of $AlCl_{23}$.

The test results are given below.

|  | Pitting potential (V) | | |
| --- | --- | --- | --- |
|  | Tube | Fin | Fillet |
| EXAMPLE 1 | −0.675 | −0.675 | −1.05 |
| 2 | −0.696 | −0.696 | −1.05 |
| 3 | −0.677 | −0.677 | −1.05 |
| 4 | −0.680 | −0.685 | −1.05 |
| 5 | −0.681 | −0.681 | −1.05 |
| COMP. EX. | −0.725 | −0.746 | −1.05 |

Further the heat exchangers were subjected to sixty cycles of a combined cycle test (CCT), each cycle comprising drying in hot air for 2.5 hours, salt spray test for 5.5 hours, exposure to outside air stream for 1.5 hours and humidity cabinet test for 14.5 hours.

Consequently, with each of the heat exchangers of EXAMPLES 1 to 5 the fillet 4 between the tube 1 and the fin 2 was corroded over the entire surface, but no cracks developed in the vicinity of the interfaces between the fillet 4 and the tube 1 and between the fillet 4 and the fin 2. In the case of the heat exchanger of COMPARATIVE EXAMPLE, on the other hand, cracks occurred in the vicinity of the interfaces between the fillet 4 and the tube 1 and between the fillet 4 and the fin 2.

What is claimed is:

1. A heat exchanger made of aluminum comprising a tube and a fin joined thereto by a fillet substantially made of zinc, each of the tube and the fin being prepared from a material made of aluminum and being nobler than the fillets by at least 0.325 V in terms of potential.

2. A heat exchanger as defined in claim 1, wherein the tube and the fin are prepared from a material made of aluminum and nobler than the fillet by at least 0.375 V in terms of potential.

3. A heat exchanger as defined in claim 1, wherein the material made of aluminum is an aluminum alloy including between 0.1 and 1.0 wt. % of copper, and the balance being aluminum and inevitable impurities.

4. A heat exchanger as defined in claim 3, wherein the copper content of the aluminum alloy is between 0.2 and 0.5 wt %.

5. A heat exchanger as defined in claim 1, wherein the material made of aluminum is an aluminum alloy including between 0.1 and 1.0 wt. % of copper, between 0.1 and 1.0 wt. % of manganese, and the balance being aluminum and inevitable impurities.

6. A heat exchanger as defined in claim 5, wherein the copper content of the aluminum alloy is between 0.2 and 0.5 wt. %.

7. A heat exchanger as defined in claim 5, wherein the manganese content of the aluminum alloy is between 0.2 and 0.5 wt. %.

8. A heat exchanger as defined in claim 5, wherein the aluminum alloy further comprises at least one of titanium, boron, chromium and zirconium in an amount of between 0.01 and 0.1 wt. %, between 0.01 and 0.1 wt. %, between 0.01 and 0.5 wt. %, and between 0.01 and 0.5 wt. %, respectively.

9. A heat exchanger as defined in claim 1, wherein the fin and the tube are made of the same material.

* * * * *